(12) United States Patent
Nakahara et al.

(10) Patent No.: US 8,535,824 B1
(45) Date of Patent: Sep. 17, 2013

(54) ELECTROCHEMICAL DEVICE HAVING ELECTRODE IN COMMUNICATION WITH CLAD TAB

(75) Inventors: Hiroshi Nakahara, Santa Clarita, CA (US); Sang Young Yoon, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 2407 days.

(21) Appl. No.: 11/339,920

(22) Filed: Jan. 25, 2006

(51) Int. Cl.
*H01M 2/08* (2006.01)

(52) U.S. Cl.
USPC ........... 429/122; 429/181; 429/161; 429/180; 429/210; 428/461; 428/458; 428/344

(58) Field of Classification Search
USPC ................. 429/122, 130, 210, 162; 428/461, 428/458; 219/145
See application file for complete search history.

(56) References Cited

U.S. PATENT DOCUMENTS

| | | | | |
|---|---|---|---|---|
| 4,958,060 A | * | 9/1990 | Mankins et al. | 219/145.22 |
| 5,271,546 A | * | 12/1993 | Hardwick | 228/107 |
| 6,576,365 B1 | * | 6/2003 | Meitav et al. | 429/130 |
| 6,632,538 B1 | * | 10/2003 | Yamazaki et al. | 428/461 |
| 2004/0086783 A1 | * | 5/2004 | Fong et al. | 429/181 |

* cited by examiner

*Primary Examiner* — Melvin C Mayes
*Assistant Examiner* — Colette Nguyen
(74) *Attorney, Agent, or Firm* — Gavrilovich Dodd + Lindsey, LLP

(57) ABSTRACT

An electrochemical device has one or more electrodes in electrical communication with a tab assembly. The tab assembly includes a tab having one or more clad regions. Each clad region includes a metal clad onto the tab.

14 Claims, 7 Drawing Sheets

ELECTROCHEMICAL DEVICE HAVING ELECTRODE IN COMMUNICATION WITH CLAD TAB

STATEMENT REGARDING FEDERALLY SPONSORED RESEARCH OR DEVELOPMENT

This invention was made with United States Government support under contract W15P7-05-C-P212 awarded by the U.S. Army Communications-Electronic Research & Engineering Center. The United States Government has certain rights in this invention.

FIELD

The present invention relates to electrochemical devices, and more particularly to a battery employing an electrode with a tab.

BACKGROUND

A variety of batteries employ one or more electrodes having a tab extending from a substrate. The tab is often made from an aluminum foil. However, aluminum foil is often not sturdy enough to survive battery assembly, handling and/or certain applications where vibration and/or shock occurs. As a result, these tabs are often welded to a nickel plate to provide additional support. However, welding of the aluminum to nickel is often difficult. Further, the heat associated with this welding is often conducted through the tab and can damage the cell chemistry. As a result, there is a need for an improved electrode tab.

SUMMARY

An electrochemical device has one or more electrodes in electrical communication with a tab assembly. The tab assembly includes a tab having one or more clad regions. Each clad region includes a metal clad onto another material. In some instances, the tab includes clad regions on opposing sides of the tab. The tab can include aluminum and the cladding can include one or more components selected from a group consisting of Nickel and Stainless Steel.

In some instances, at least one clad region covers only a portion of the tab. The clad region can extend from a position on the tab that is furthest from the one or more electrodes toward the one or more electrodes.

At least one electrode can include a substrate body welded to the tab. Alternately, at least one electrode can include a substrate body that is integral with the tab.

Methods of generating and using the electrochemical device are disclosed.

BRIEF DESCRIPTION OF THE FIGURES

FIG. 1A is a sideview of the tab assembly.

FIG. 1B is a cross-section of the tab assembly taken along a line extending between the brackets labeled B in FIG. 1A and taken looking in the direction of the arrow labeled B in FIG. 1A.

FIG. 2A is a sideview of the tab assembly.

FIG. 2B is a cross-section of the tab assembly taken along a line extending between the brackets labeled B in FIG. 2A and taken looking in the direction of the arrow labeled B in FIG. 2A.

FIG. 3A is a side view of an electrode including the tab assembly of FIG. 1A and FIG. 1B. FIG. 3B is a sideview of the electrode shown in FIG. 3A taken looking in the direction of the arrow labeled B in FIG. 3A.

FIG. 4A is a sideview of the pouch cell. FIG. 4B is a side view of the pouch cell shown in FIG. 4A taken looking in the direction of the arrow labeled B. FIG. 4C is a cross section of the pouch cell shown in FIG. 4A taken looking along a line extending between the brackets labeled C and in the direction of the arrow labeled B in FIG. 4A.

DESCRIPTION

An electrochemical device such as a battery or capacitor is disclosed with one or more electrodes having an active material positioned on a substrate. The substrate includes a tab extending from a substrate body. At least a portion of the tab includes a cladding that serves as a supporting material. The cladding provides the tab with the mechanical strength required to survive battery assembly, handling and/or certain applications where vibration and/or shock occurs. Since the cladding provides the support, there is no need to weld the tab to a nickel plate. Accordingly, the tab structure can reduce or eliminate damage to the battery chemistry from welding of the tab. Additionally, the cladding can be positioned on only a portion of the tab and need not be positioned on the substrate body. As a result, the cladding need not affect the substrate body and permits the use of lightweight materials for the substrate body.

Figure 1B:
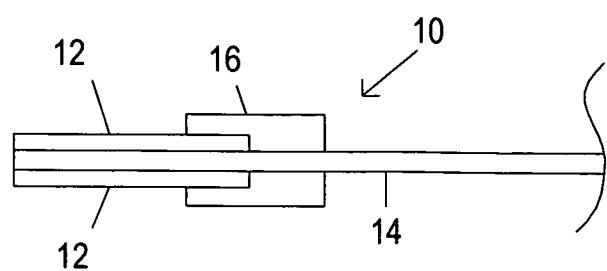
FIG. 1A and FIG. 1B illustrate a tab assembly having a clad tab.
Figure 1A:
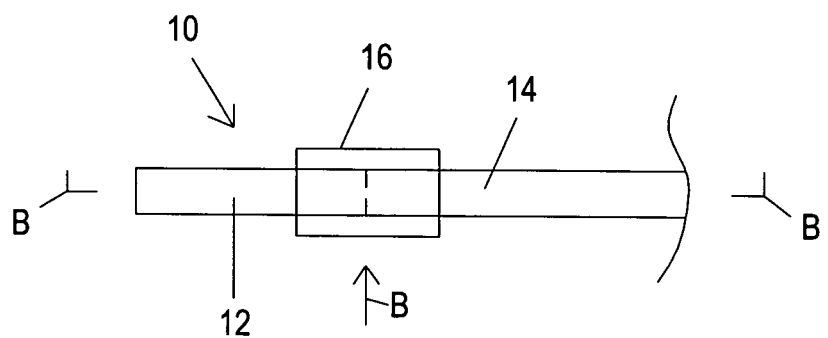

FIG. 1A is a sideview of a tab assembly 10. FIG. 1B is a cross-section of the tab assembly 10 taken along a line extending between the brackets labeled B in FIG. 1A and taken looking in the direction of the arrow labeled B in FIG. 1A. The tab assembly 10 includes a cladding 12 positioned on a tab 14. Although the cladding 12 is shown as positioned on both side of the tab 14, the cladding 12 can be positioned on one side of the tab 14. The tab assembly optionally includes a sealing medium 16 positioned on the tab 14 and the cladding. The dashed line in FIG. 1A illustrates the location of the cladding 12 under the sealing medium 16. The cladding 12 can be positioned on the entire tab 14 but can also be positioned on a portion of the tab 14. The sealing medium 16 can be positioned so as to cover the intersection between the cladding 12 and the tab 14 as is evident in FIG. 1A. Accordingly, the sealing medium 16 can be positioned in contact with both the cladding 12 and the tab 14. The sealing medium is preferably positioned such that no cladding is exposed on the side of the sealing medium that will be positioned in the interior of an electrochemical device. As a result, the cladding is not exposed to electrolyte on the interior of an electrochemical device.

Figure 2B:
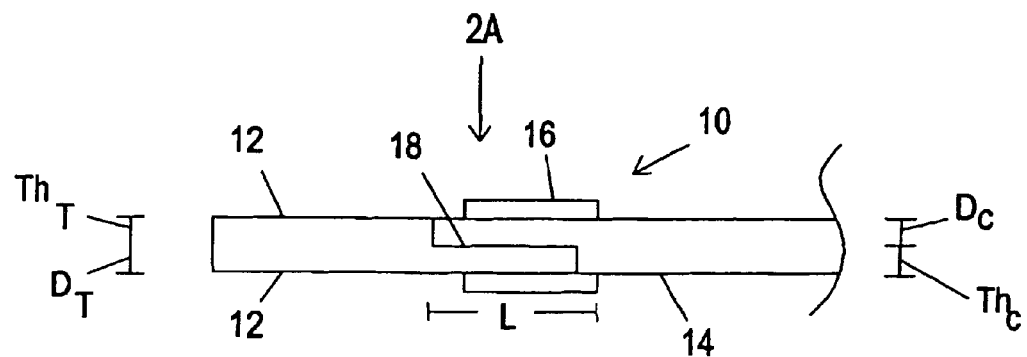
FIG. 2A and FIG. 2B illustrate a tab assembly having a clad tab.
Figure 2A:
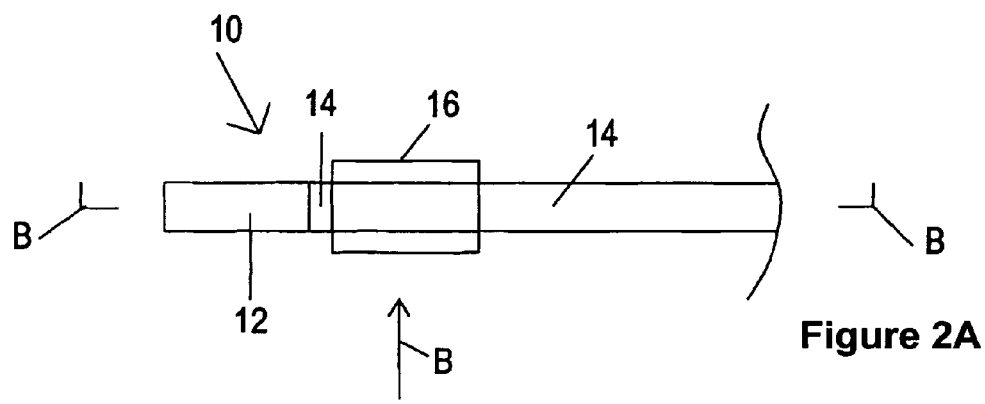

FIG. 2A and FIG. 2B provide another embodiment of a tab assembly 10. FIG. 2A is a sideview of the tab assembly 10. FIG. 2B is a cross-section of the tab assembly 10 taken along a line extending between the brackets labeled B in FIG. 1A and taken looking in the direction of the arrow labeled B in FIG. 1A. The sideview shown in FIG. 2B is taken looking in the direction of the arrow labeled A in FIG. 1A. The tab 14 and the cladding 12 each include a step 18. The steps are complementary. For instance, the length of the step, L, on the cladding 12 and tab 14 can be the same. When the length of the step 18 is the same, the step 18 of the cladding 12 can be positioned on the step 18 of tab 12 as shown in FIG. 2B. Additionally, the thickness of the cladding step, $Th_C$, can be the same as the depth of the tab step, $D_T$. This arrangement permits the bottom of the tab assembly to be smooth where the cladding meets the tab as illustrated in FIG. 2B. Additionally or alternately, the thickness of the tab step, $Th_T$, can be the same as the depth of the cladding step, $D_T$. This arrangement permits the top of the tab assembly to be smooth where the cladding meets tab as illustrated in FIG. 2B. Accordingly, one or both of the top and bottom of the tab assembly can be smooth where the cladding meets the tab. As will become evident below, this smoothness may enhance the sealing between the tab assembly and the battery casing or pouch.

Figure 2C:
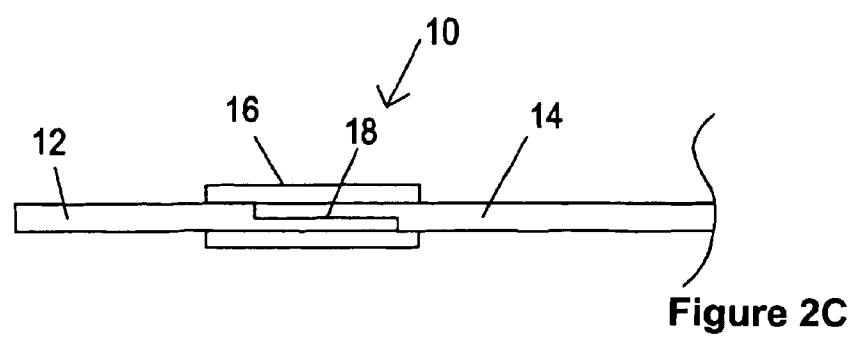
FIG. 2C is a cross-section of a tab assembly.

The sealing medium in FIG. 2A and FIG. 2B is positioned such that a portion of the tab and the cladding are exposed on the side of the tab assembly that will not be positioned in the interior of an electrochemical device. However, the sealing medium is shown positioned such that no cladding is exposed on the side of the sealing medium that will be positioned in the interior of the electrochemical device. FIG. 2C illustrates the tab assembly of FIG. 2B with the sealing medium positioned such that neither the cladding nor the tab are exposed on the side of the tab assembly that will not be positioned in the interior of an electrochemical device.

Although FIG. 2A through FIG. 2C illustrate the tab assembly having only one step at the interface of the cladding and the tab, the tab assembly can include more than one steps and/or a slope at the interface of the cladding and the tab.

The cladding 12 can be a conducting material to permit the flow of electrical current through the cladding 12. For instance, the cladding 12 can be a metal. While metals with substantially different melting points often can not be bonded to one another with techniques such as laser welding, cladding 12 technologies are available that permit cladding 12 of one metal with another metal having a substantially different melting point. Accordingly, the tab 14 can be a low density/low cost material such as aluminum while the cladding 12 can be a sturdier material such as nickel and/or stainless steel. Further, the tab 14 can have a lower melting point than the cladding 12. Other suitable materials for the cladding 12 include, but are not limited to, aluminum, nickel and Stainless Steel. Suitable materials for the tab 14 include, but are not limited to, Ni, Stainless Steel, Fe, Au, Ti, Cu, Cu-Nickel alloy and nickel alloys.

Figure 3A:
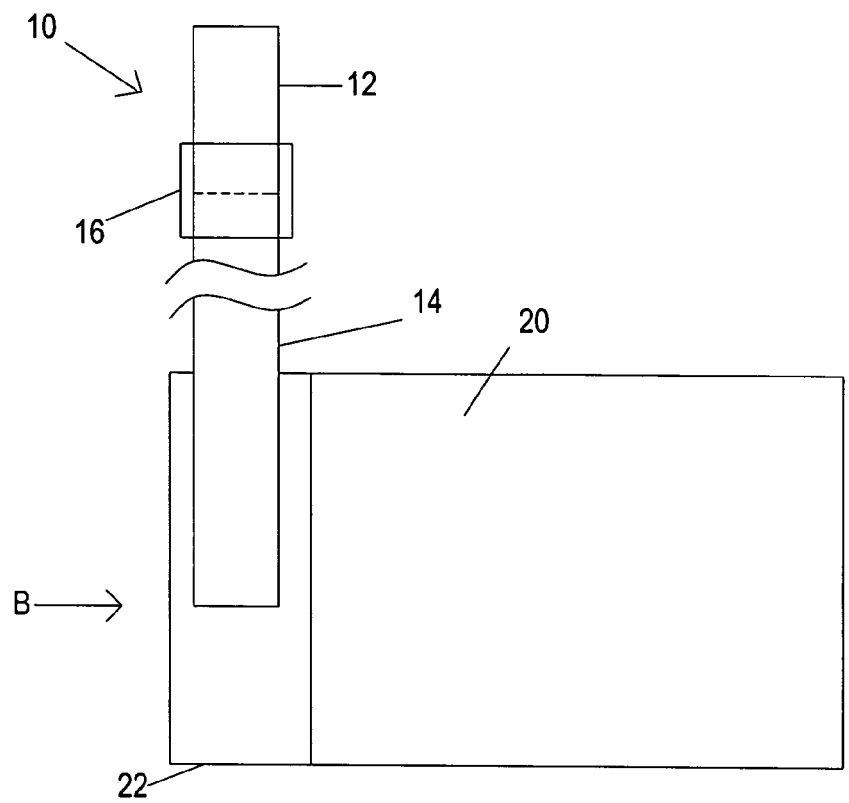
FIG. 3A and FIG. 3B illustrate an electrode including the tab assembly.
Figure 3B:
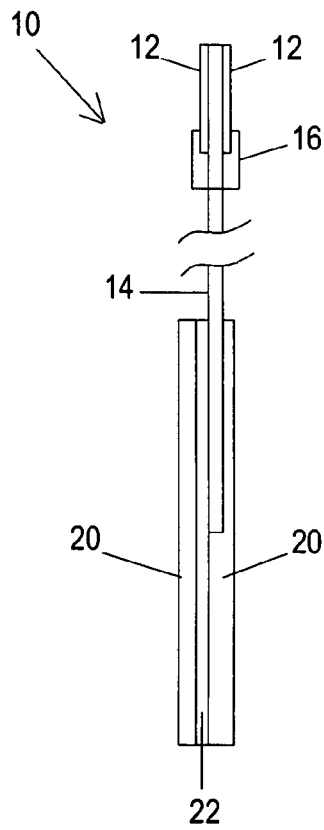

FIG. 3A is a side view of an electrode including the tab assembly 10 of FIG. 1A and FIG. 1B. FIG. 3B is a sideview of the electrode shown in FIG. 3A taken looking in the direction of the arrow labeled B in FIG. 3A. The electrode can be an anode or a cathode. The electrode includes an active material 20 positioned on a substrate body 22. Suitable materials for the substrate body 22 includes, but are not limited to, Ni, Al, and Stainless Steel particularly 30 series Stainless Steel. The tab 14 is connected to an exposed portion of the substrate body 22 that serves as the electrode tab. As will be evident below, an electrode tab can extend away from the substrate body 22. The tab 14 is often connected to the substrate body 22 using an ultrasonic weld or a laser weld. The material for the substrate body 22 can be the same or different from the material for the tab 14. Although the active material 20 is shown on both sides of the substrate body 22, the active material 20 can be positioned on only one side of the substrate body 22. The tab 14 can serve as a battery terminal or can be in electrical communication with a battery terminal.

Figure 3C:
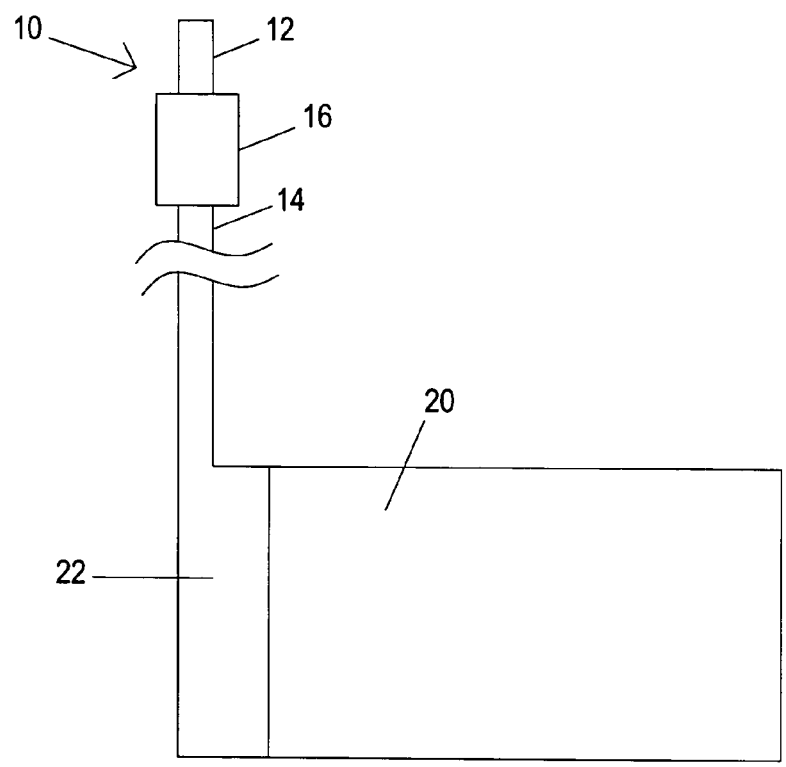
FIG. 3C is a sideview of an electrode having a substrate that is integral with a tab assembly.

Although FIG. 3A and FIG. 3B illustrate the tab 14 connected to the substrate body 22, the tab 14 can be integral with the substrate body 22 as illustrated in FIG. 3C. Although FIG. 3A and FIG. 3B are illustrated as employing a tab assembly constructed according to FIG. 1A and FIG. 1B, the tab assembly of FIG. 2A through FIG. 2C can be employed.

In some instances, the substrate body 22 also serves as the active material 20 are the same. For instance, the substrate body 22 can be lithium metal which can also serve as the active material 20. As a result, the electrode need not include a separate active material 20 on the substrate body 22.

Figure 4A:
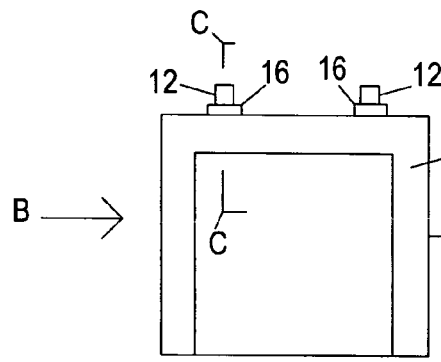
FIG. 4A through FIG. 4C illustrate a pouch cell that employs a tab assembly.
Figure 4B:
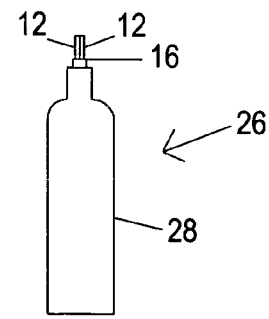
Figure 4C:
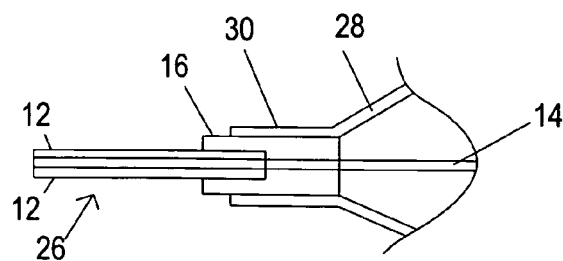

Electrodes that include the tab assembly 10 can be employed in conjunction with a variety of battery constructions. For instance, the electrode can be employed in a pouch cell or a pouch battery. FIG. 4A is a sideview of a pouch cell 26. FIG. 4B is a side view of the pouch cell 26 shown in FIG. 4A taken looking in the direction of the arrow labeled B. FIG. 4C is a cross section of the pouch cell 26 shown in FIG. 4A taken looking along a line extending between the brackets labeled C and in the direction of the arrow labeled B in FIG. 4A. The pouch cell 26 includes electrodes positioned in a pouch 28 which serves as the battery casing. Suitable materials for the pouch include, but are not limited to, aluminum. Although not illustrated, a separator is positioned between adjacent pairs of anodes and cathodes. The pouch can be formed from a flap of material with a sealed region 30 at the perimeter. A tab 14 connected to one or more anodes extends through the sealed region 30. At least a portion of the sealing medium 16 is positioned in the sealed region 30 such that the sealing medium 16 seals the regions of the pouch adjacent to the tabs 14. Although all of the cladding 12 on a tab 14 can be outside of the pouch, at least a portion of the cladding 12 is preferably positioned in the pouch as is evident in FIG. 4C. Positioning at least a portion of the cladding 12 in the pouch is desirable because having the entire tab outside of the pouch can result in a weak tab.

Figure 4D:
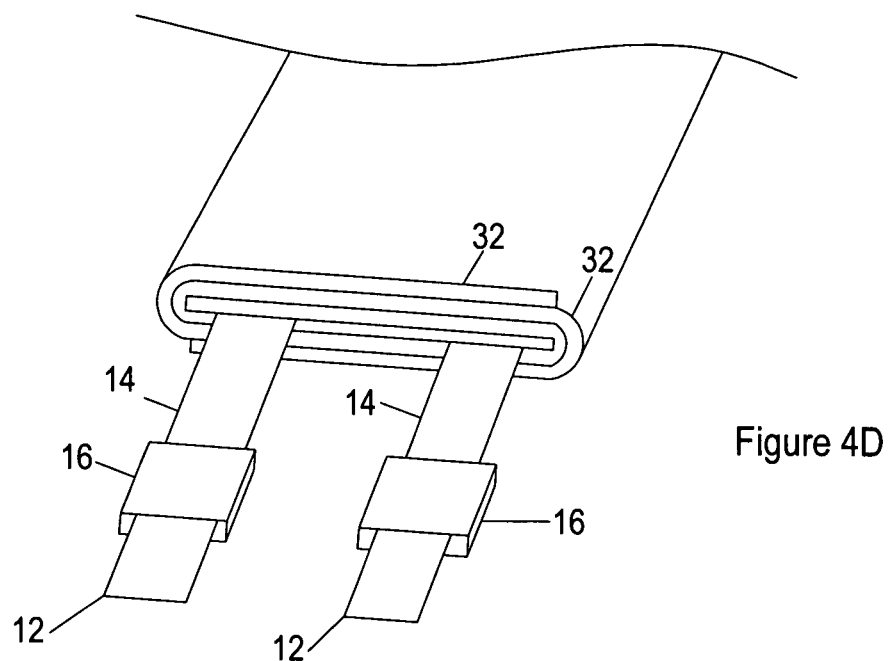
FIG. 4D illustrates a wound arrangement of electrodes suitable for use in a pouch cell.

The electrodes can be stacked or wound in the pouch. For instance, FIG. 4D illustrates a wound arrangement of the electrodes 32 suitable for use in the pouch cell 26 of FIG. 4A through FIG. 4C. One of the electrodes 32 serves as an anode and one of the electrodes serves as a cathode. A different tab 14 is in electrical communication with each of the electrodes. Although not illustrated, a separator is positioned between the anode and the cathode. Although only two electrodes 32 are illustrated in the wound arrangement, more than two electrodes 32 can be wound together.

Figure 4E:
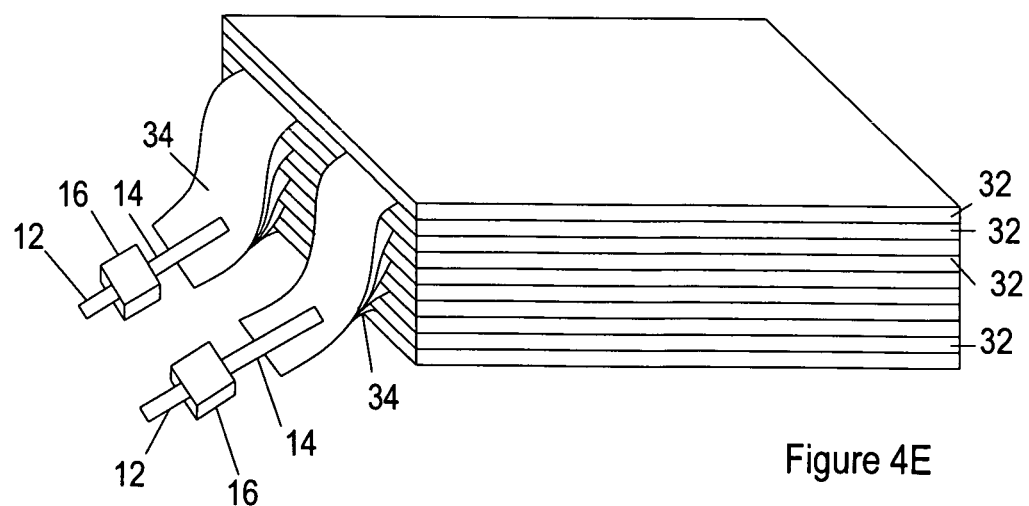
FIG. 4E illustrates a stacked arrangement of electrodes suitable for use in a pouch cell.

FIG. 4E illustrates a stacked arrangement of the electrodes 32 suitable for use in the pouch cell 26 of FIG. 4A through FIG. 4C. In the stack, anodes are alternated with cathodes. Although not illustrated, a separator is positioned between adjacent anodes and cathodes. The electrodes 32 each include an electrode tab 34 that extends outward from the substrate body 22. The electrode tabs 34 are in electrical communication with one another and with a tab 14. Accordingly, a different tab 14 is in electrical communication with the anodes than is in electrical communication with the cathodes. The stack can include only two electrodes 32. Accordingly, each tab 14 can be in electrical communication with a single electrode.

Pouch cells can be used in a variety of different applications. A suitable application for the pouch cells is illustrated in U.S. patent application Ser. No. 11/269,285, filed on Nov. 8, 2005, entitled "Modular Battery Pack," and incorporated herein in its entirety. Although the tab 14 is illustrated in conjunction with a pouch cell, the tab 14 structure can be used in conjunction with other battery structures.

Although FIG. 4A through FIG. 4E are illustrated as employing a tab assembly constructed according to FIG. 1A and FIG. 1B, the tab assembly of FIG. 2A through FIG. 2C can be employed.

Figure 5A:
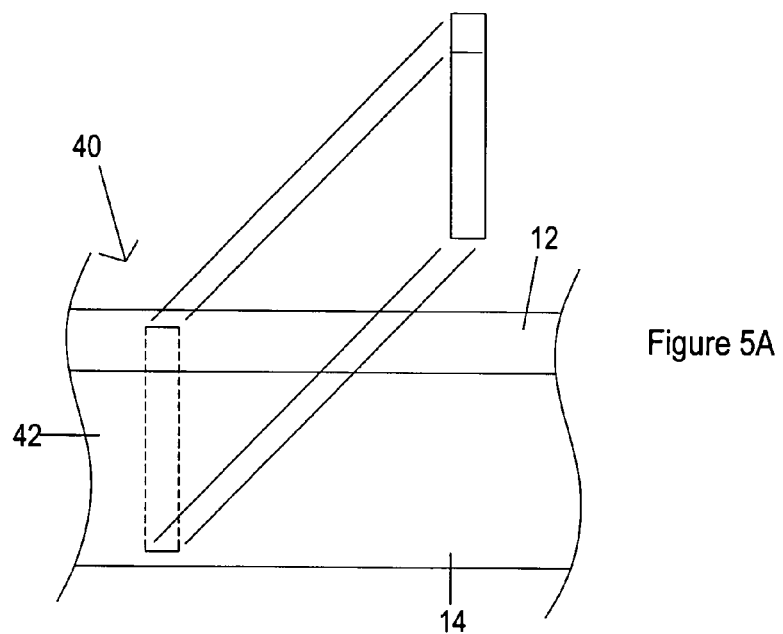
FIG. 5A illustrates a method of forming a tab according to FIG. 1A and FIG. 1B.

FIG. 5A illustrates a method of forming a tab 14 according to FIG. 1A and FIG. 1B. The tab 14 can be formed from a metal sheet 40 that includes a cladding 12 on a base metal 42 that will become the tab 14 and the cladding 12 as shown in FIG. 5A. The relationship between the metal base and cladding can be the same as the relationship between the cladding and tab illustrated in FIG. 1A and FIG. 1B or in FIG. 2A through FIG. 2C. The metal sheet 40 can have a variety of different shapes including, but not limited to, a strip shape, square, rectangular, round or oval. The thickness of the cladding 12 in the metal sheet 40 can be about the desired thickness of the cladding 12 on the tab assembly 10. In some instances, the thickness of the cladding 12 in the metal sheet 40 may be reduced as a result of pressing and/or rolling during the subsequent processing of the metal sheet 40. In some instances, the metal sheet 40 is wider than the tab 14 to facilitate extraction of the tab 14 from the metal sheet 40. Although not evident from the illustration, additional cladding 12 can optionally be positioned on the opposing side of the metal sheet 40.

A metal cladding 12 process is employed to form the cladding 12 on the base metal 42. Metal cladding 12 processes can form a metallurgical bond between the cladding 12 and the base metal 42. Metal cladding 12 processes are distinguishable from other metal bonding processes because they rely on elevated pressure to cause diffusion of the metals into one another. As a result, there is little or no melting of the metals in contrast with other metal bonding techniques such as welding. Additionally, metal cladding 12 processes permit forming metal-to-metal bonds over large areas. As a result cladding 12 processes are often suitable for bonding together the faces of metal strips or sheets. The above features allow the bond resulting from cladding 12 processes to be distinguished from the bond formed by other processes.

There are different methods for forming clad metals, such as aluminum clad with stainless steel. In one method, the cladding 12 metal is fed onto the metal sheet 40 in contact with the base metal 42 and the result is then passed to a hot roll bonding system. Another method produces a clad metal by forming and fixing a powder that includes or consists of the cladding 12 on the base metal 42 without heat, melting and solidifying only the surface and a subsurface area of the layer of the metal powder in a vacuum, and subjecting the material to hot isostatic pressing. Explosion bonding is another example of a method that is suitable for cladding 12 thick layers of material. Suitable technologies for forming a cladding 12 according to FIG. 5A are available from TMI (Technical Materials, Inc. of Lincoln, R.I.), Mitanishoji of Japan, and Cladmetals, LLC.

The tab 14 is extracted from the metal sheet 40 along the dashed lines illustrated in FIG. 5A. For instance, the tab 14 can be stamped or punched from the metal sheet 40. The sealing medium 16 can be formed on the tab 14 by heat sealing, by casting a material such as polypropylene, or by positioning adhesive agents such as glues r epoxies in the desired location. The tab 14 can be connected to a substrate body 22 before or after placement of the sealing medium 16 on the tab 14.

Figure 5B:
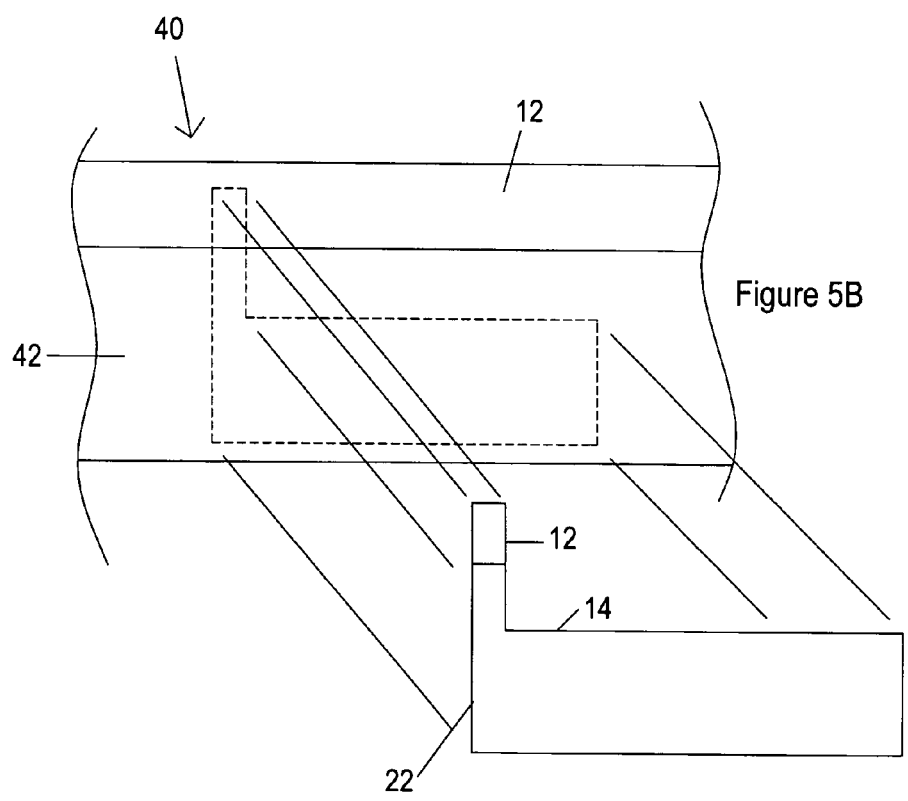
FIG. 5B illustrates a method of forming a substrate according to FIG. 3C.

The method illustrated in FIG. 5A can be adapted to form a substrate body 22 such as the substrate body 22 illustrated in FIG. 3C. The substrate body 22 and tab 14 can be extracted from the metal sheet 40 along the dashed lines in FIG. 5B. For instance, the substrate body 22 and tab 14 can be stamped or punched from the metal sheet 40. The sealing medium 16 can be formed on the tab 14 by heat sealing, by casting a material such as polypropylene, or by positioning adhesive agents such as glues r epoxies in the desired location. The tab 14 can be connected to a substrate body 22 before or after placement of the sealing medium 16 on the tab 14.

Figure 6A:
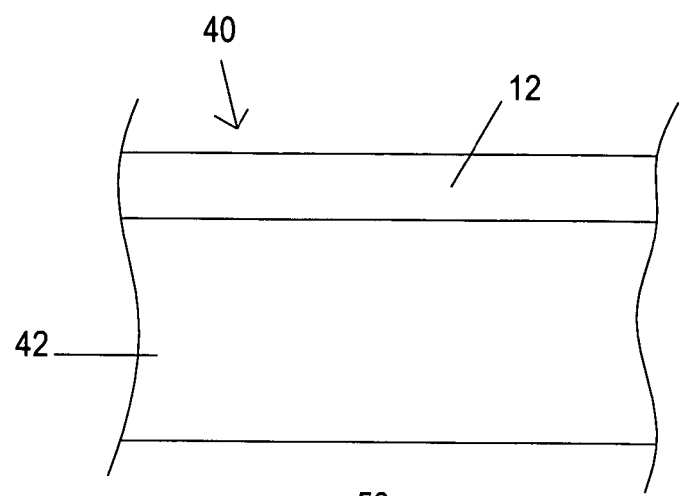
FIG. 6A through FIG. 6C illustrate a method of forming an electrode according to FIG. 3C.
Figure 6B:
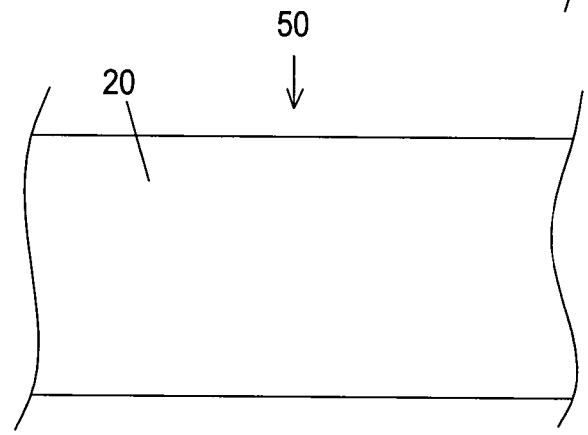
Figure 6C:
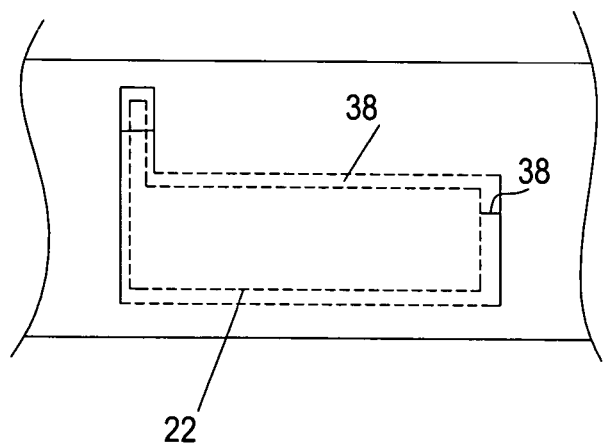

FIG. 6A through FIG. 6C illustrate a method of forming an electrode according to FIG. 3C. FIG. 6A shows a metal sheet 40 having the cladding 12 on a base metal 42 as disclosed in the context of FIG. 5A. An active material 20 is positioned on the metal sheet 40 of FIG. 5A to provide the sheet of material 50 shown in FIG. 6B. In some instances, the sheet 50 illustrated in FIG. 6B can be generated by purchasing the sheet 50 from a supplier. Alternately, the active material 20 can be coated on the metal sheet 40 by using a coating machine such as a three roll reverse coater or a slot die coater. Alternately, the sheet 50 of material can be formed by mixing the components of the active medium in a slurry. The slurry can be coated on the metal sheet 40 and dried so as to form the active material 20 on the metal sheet 40. In some instance, the active material 20 is formed on the metal sheet 40 by, lamination, deposition and/or sputtering.

Laser ablation can be employed to remove the active material 20 from a region 38 of the sheet 50. U.S. patent application Ser. No. 11/116,995, filed on Jun. 22, 2005, entitled "exposing the Substrate of a Battery Electrode," and incorporated herein in its entirety, discloses the used of laser ablation to remove active materials 20 from a substrate. The electrode can be extracted from the sheet along the dashed lines illustrated in FIG. 6C. For instance, the electrode can be stamped or punched from the metal sheet 40. The sealing medium 16 can be formed on the tab 14 by heat sealing, by casting a material such as polypropylene, or by positioning adhesive agents such as glues r epoxies in the desired location. The tab 14 can be connected to a substrate body 22 before or after placement of the sealing medium 16 on the tab 14.

The battery can be a primary battery or a secondary battery. Further, the above electrode and tab constructions can be employed in other electrochemical devices such as capacitors and hybrid capacitors/batteries.

Many of the illustrations and discussions above are disclosed using the tab assembly disclosed in FIG. 1A and FIG. 1B, however, the illustrated methods, devices can employ the tab assembly of FIG. 2A through FIG. 2C.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A electrochemical device, comprising:
one or more electrodes in electrical communication with a tab assembly, the tab assembly including a tab having one or more clad regions that each include a metal cladding positioned on the tab, the metal cladding being bonded to the tab with a bond that is in accordance with a bond formed by a metal cladding process that relies on elevated pressure to cause diffusion of the metal cladding and the tab into one another.

2. The electrochemical device of claim 1, wherein clad regions are positioned on opposing sides of the tab.

3. The electrochemical device of claim 1, wherein at least one clad region extends from a position on the tab that is furthest from the one or more electrodes toward the one or more electrodes.

4. The electrochemical device of claim 1, wherein at least one electrode includes a substrate body and the tab is welded to the substrate body.

5. The electrochemical device of claim 1, wherein at least one electrode includes a substrate body and the tab is integral with the substrate body.

6. The electrochemical device of claim 1, wherein the clad regions cover only a portion of the tab.

7. The electrochemical device of claim 1, wherein the tab includes aluminum and the metal cladding includes one or more components selected from a group consisting of Nickel and Stainless Steel.

8. The electrochemical device of claim 1, wherein the tab is a metal tab.

9. The electrochemical device of claim 1, wherein the tab and the cladding each include one or more complementary steps at an interface of the cladding and the tab.

10. The electrochemical device of claim 9, wherein the tab and cladding are flush where the cladding meets the tab at one or more surfaces selected from a group consisting of an upper surface of the tab assembly and a lower surface of the tab assembly.

11. A method of generating a electrochemical device, comprising:

generating one or more electrodes in electrical communication with a tab assembly, the tab assembly including a tab having one or more clad regions that each include a metal cladding on the tab, the metal cladding being bonded to the tab with a bond that is in accordance with a bond formed by a metal cladding process that relies on elevated pressure to cause diffusion of the metal cladding and the tab into one another.

12. The method of claim 11, wherein generating the one or more electrodes includes connecting the tab to a substrate body of one or more electrodes.

13. The method of claim 11, wherein generating the one or more electrodes includes employing a metal cladding process to form a metal sheet with the metal from which the metal cladding is formed cladding a material from which the tab is formed.

14. The method of claim 13, further comprising:
separating the tab from the metal sheet.

* * * * *